(12) United States Patent
Cheriton

(10) Patent No.: US 7,630,312 B1
(45) Date of Patent: Dec. 8, 2009

(54) APPROXIMATED PER-FLOW RATE LIMITING

(75) Inventor: David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 861 days.

(21) Appl. No.: 10/827,068

(22) Filed: Apr. 19, 2004

Related U.S. Application Data

(63) Continuation of application No. 09/307,305, filed on May 7, 1999, now Pat. No. 6,724,721.

(51) Int. Cl.
  *H04J 1/16* (2006.01)
  *H04L 12/28* (2006.01)
  *H04L 12/54* (2006.01)

(52) U.S. Cl. .................. 370/235; 370/412; 370/429

(58) Field of Classification Search ...... 370/229–236.1, 370/389
    See application file for complete search history.

(56) References Cited

U.S. PATENT DOCUMENTS

| | | | | |
|---|---|---|---|---|
| 5,303,237 | A | * | 4/1994 | Bergman et al. ............. 370/418 |
| 5,453,982 | A | | 9/1995 | Pennington et al. ......... 370/85.1 |
| 5,541,912 | A | * | 7/1996 | Choudhury et al. .......... 370/412 |
| 6,046,979 | A | * | 4/2000 | Bauman ...................... 370/229 |
| 6,157,955 | A | | 12/2000 | Narad et al. ................ 709/228 |
| 6,426,943 | B1 | * | 7/2002 | Spinney et al. .............. 370/235 |

OTHER PUBLICATIONS

Abhijit K. Choudhury et al., "Dynamic Queue Length Thresholds for Multipriority Traffic," 15th International Teletraffic Congress, a publication of Bell Laboratories, Jun. 1997.
Abhijit K. Choudhury et al., "Dynamic Queue Length Thresholds for Shared-Memory Packet Switches," Bell Laboratories, a publication of IEEE/ACM Transactions on Networking, vol. 6, No. 2, Apr. 1998, pp. 130-140.
Abhijit K. Choudhury et al., "Dynamic Thresholds for Multiple Loss Priorities," Bell Laboratories, Lucent Technologies, a publication of IEEE ATM '97 Workshop, May 1997.
Dong Lin et al., "Dynamics of Random Early Detection," Computer Communication Review, a publication of ACM Sigcomm, vol. 27, No. 4, Oct. 1997, ISSN # 0146-4833.

\* cited by examiner

*Primary Examiner*—Chirag G Shah
*Assistant Examiner*—Srinivasa R Reddivalam
(74) *Attorney, Agent, or Firm*—Campbell Stephenson LLP

(57) ABSTRACT

A method and apparatus to limit the throughput rate on a packet-by-packet basis. Each packet of an input flow is mapped to an entry in a flow table for each output queue. The mapping is based on a subset of the packet's header data, giving an approximation of per-flow management. Each entry contains a credit value. On packet reception, the credit value is compared to zero; if there are no credits, the packet is dropped. Otherwise, the size of the packet is compared to the credit value. If sufficient credits exist (i.e., size is less than or equal to credits), the credit value is decremented by the size of the packet in cells and the packet is processed. If the size of the packet exceeds the available credits, the credit value is set to zero and the packet is dropped. A periodic task adds credits to each flow table entry up to a predetermined maximum.

56 Claims, 10 Drawing Sheets

APPROXIMATED PER-FLOW RATE LIMITING

This application is a continuation of U.S. patent application Ser. No. 09/307,305, entitled "Approximated Per-Flow Rate Limiting", filed May 7, 1999 now U.S. Pat. No. 6,724,721, and naming David R. Cheriton as the inventor. This application is assigned to CISCO TECHNOLOGY, INC., the assignee of the present invention, and is hereby incorporated by reference, in its entirety and for all purposes.

BACKGROUND OF THE INVENTION

1. Field of the Invention

The present invention relates to internetworking systems and in particular to methods and apparatus for managing traffic flow in routers and switches.

2. Description of the Related Art

Internetworking encompasses all facets of communications between and among computer networks. Such communications data flow streams may include voice, video, still images, and data traffic. All have widely varying needs in terms of propagation delay (or latency) during transit through the network. Various systems and devices, both in hardware and in software, have attempted to deal with the plethora of data flow requirements present in modern internetworking systems.

One such scheme consists of attempting to regulate the traffic within the router or switch connecting multiple networks in the typical internetworking system. Such schemes attempt to provide fair allocation of data throughput capacity (bandwidth) by allocating router buffer and/or queue space according to the type of packets in each flow stream received.

A particular problem in internetworking traffic regulation arises from the variety of traffic sources or flows presented to the router/switching device. Referring to FIG. 1, illustrating a high-level schematic view of the operation of a prior art router/switch 10, a number of input flows 20 are presented to the unit. These flows each consist of multiple packets of data in a variety of sizes and presented at a variety of rates. Additionally, flows may be presented in different protocols, such as the Transmission Control Protocol/Internet Protocol (TCP/IP) and the related User Datagram Protocol (UDP), File Transfer Protocol (FTP), Terminal Emulation Protocol (Telnet), and Hypertext Transfer Protocol (HTTP). Other internetworking protocols are found in the literature, such as Merilee Ford, et. al., *Internetworking Technologies Handbook*, Cisco Press 1997 (hereinafter Ford), incorporated herein by reference in its entirety. The packets are buffered in a buffer pool 30, which is typically random access memory (RAM). Buffering is accomplished according to the directives of a controller 60 and a buffer manager 25. The flows are sent to the proper output port 70 by way of a set of output queues 40 and a port scheduler 50, discussed below. Controller 60 is conventionally implemented as one or more high speed microprocessors with associated interface circuitry. Buffer manager 25 and port scheduler 50 can be implemented as part of a switch ASIC.

Some flows are well-behaved in the event of traffic congestion: when faced with packet drops (i.e., packets discarded deliberately by a downstream device due to congestion at that device), these "good" (robust) flows reduce their flow rates and send less packets per unit of time. Other flows, however, are not well-behaved. These non-adaptive "aggressive" flows (NAFs) do not throttle back the flow of packets to the router when they experience drops. This may be because the NAFs do not recognize the congestion (sometimes due to protocol incompatibilities) or more likely because they actually are trying to capture more bandwidth. The latter situation arises particularly in flows sent by sources that consider themselves higher priority than all others (hence the term "aggressive"); such priority assumptions by one flow are often in error in the modern, highly heterogeneous networks seen today.

Several regulation schemes are known in the art. Broadly classified, these schemes fall into two types: queue-based and buffer-based.

In queue-based schemes, incoming flows are classified according to their actual priority, as determined by the receiving router, and assigned accordingly to output queues within the router. High priority flows, such as time-sensitive voice traffic, are placed in a queue that is read out more often. Low priority flows, such as file transfer protocol (FTP) or hypertext transfer protocol (HTTP) flows, are placed in queues that are read out of the router at a slower rate. Numerous schemes, discussed below, are used to control the buffering and enqueuing methods to achieve a measure of throughput balance or fairness among flows, thus managing router/switch bandwidth as efficiently as possible. As will be seen, however, all of these schemes have drawbacks in cost, capacity, and efficiency that suggest a better scheme is needed.

In the extreme, queue-based flow management assigns one queue per input flow. Queues are read out of the router according to statistically fair scheduling 10 process, such as round-robin, employing port scheduler 50. In round-robin scheduling, one packet is read out of each queue, one queue at a time, reading again from the first queue only when one packet has been read out from every other queue. This system is known as fair queuing (FQ). While FQ and its variants (e.g., weighted fair queuing, stochastic fair queuing) operate well when the number and variety of input flows is 15 small and well-behaved, they become inefficient when the number of flows grows. Clearly, a high number of flows requires a large number of queues, consuming a proportionally larger amount of resources, both in hardware and in operational complexity. More memory and more software processing overhead is required to set up and tear down the queues as flows begin and end. In the context of the modern, 20 high volume networks seen today, this extra cost and complexity is undesirably inefficient.

A less extreme variation of FQ is random early drop (RED) and variants thereon. In a RED scheme, a smaller number of queues (less than the total number of input flows present at any time) is maintained. Flows are segregated into queues by flow volume, with a number of high volume flows placed in one queue. Each queue is managed according to a probabilistic flow rule that causes packets to be dropped more often in the queues associated with the heaviest flows. Because of this relationship, heavy flows experience packet drops more often, statistically, than other flows. This scheme achieves a measure of fairness, but it assumes that heavy flows will be well-behaved, i.e., that they will reduce flow rate when they experience packet drops. This assumption has proven to be erroneous in the modern heterogeneous network. Certain NAFs do not reduce flow rate and thus continue to take an unfair amount of router bandwidth simply because they counter packet drops with retransmissions. The "good" flows get less and less throughput as they reduce flow rate in response to drops while the NAFs capture more bandwidth.

As a further drawback, the random packet drops sometimes hit fragile flows. Such flows contain time-critical traffic of the highest priority, such as voice data. Fragile flows have the lowest tolerance for drops and delay, so a random packet drop management scheme can have a highly detrimental effect on them.

An alternative to managing router/switch traffic at the queue end is to manage flows at the buffer end, referring to buffer pool 30 of FIG. 1. The basic premise of buffer-based management is that if one limits how much of a particular input flow gets into buffers 30 relative to other input flows 20, the output queues 40 will take care of themselves. Such limits on the number of packets buffered per flow can be either static or dynamic.

In the static or strict limit scheme, a set maximum number of buffers is available for each flow. Any packets received after those buffers are full are discarded. Static limits are set by the system administrator for each type of flow. However, this scheme has the obvious drawback of high overhead associated with setting up a gating mechanism for each flow and administrative oversight. Additionally, it lacks long-term flexibility to adapt to the wide variety and constantly changing mix of flow types seen in modern internetworking.

Typical prior art systems implement static buffer limitation schemes in software with limited hardware support. All experience the same or similar drawbacks noted above due to overhead (set up and tear down, as well as processing time delay and hardware resource) costs.

Dynamic buffer limiting, on the other hand, computes a buffer limit for each flow based on the size of the output queues, the size of the buffer pool, the number of buffers available at any given instant, and other router/switch state variables. Additionally, and most importantly, dynamic buffer limitation schemes compute limits based on the flow type. FIG. 2 illustrates the standard bit configuration for an Internet Protocol packet, including the fields within its header. Flow type, also known as flow classification, information can be found in, for instance, the type of service (TOS) field 210 in the internet protocol (IP) header 200 or in the source address 220 of the received packet. It can also be deduced from the type of packet received, voice being of a higher priority and thus demanding of a lower delay than other flows. While some forms of dynamic buffer limiting (DBL) are known, current schemes are unable to update their limit values fast enough to keep up with the latest generation of ultra-fast (e.g., Gigabit speed) flows. As an additional drawback, the use of TOS field 210 is not standardized among internetworking users. Thus, neither TOS nor source address is a reliable means of identifying flow type at this time.

Some of these shortcomings are addressed by the co-pending, commonly-assigned patent application entitled PER-FLOW DYNAMIC BUFFER MANAGEMENT, Ser. No. 09/238,552 (hereinafter "DBL Application"), naming Andreas V. Bechtolsheim and David R. Cheriton as inventors, the entirety of which is hereby incorporated by reference. However, large numbers of voice flows, in particular, pose additional problems not solved by the co-pending DBL Application.

A well-behaved voice flow, such as Voice-over-Internet Protocol (VoIP), makes very low demands on an internetworking switch, in terms of data rate and buffering, but needs low-latency queuing and forwarding to stay within an acceptable voice delay budget. Each voice channel needs only a small percentage of the available bandwidth; essentially no buffering would be required if all voice flows were well-behaved. However, one badly behaved flow (a voice NAF) can cause queuing, resulting in other voice flows being queued up behind it. This queuing quickly causes unacceptable delays.

The credit scheme disclosed in the DBL Application, discussed above, decrements a credit field for a given flow when packets are dropped and increments it when packets from that same flow are enqueued. That scheme is too crude, however, when flows have a nominally low data rate and are highly delay sensitive, as is the case for voice flows.

One alternative, simply giving a high priority to voice packets, runs the risk of starving other flows. Such starvation occurs when high priority packets are transmitted before all other flows, which can result in the low priority flows not being transmitted at all or with unacceptably long delays. Furthermore, such starvation can also occur when NAFs are only pretending to be voice flows, as by a deliberate mis-identification of TOS by the source. Experience has shown that malevolent users (e.g., hackers) will manipulate TOS in order to capture additional bandwidth and decrease latency in their own traffic at the expense of others.

Other existing schemes based on strict per-flow queuing are expensive to set up, manage, and tear down, as noted above. They also run at low utilization levels because voice flows are currently minority users of switch bandwidth and operate at very low data rates. Explicit bandwidth reservation schemes, such as Resource-Reservation Protocol (RSVP), described in Ford, require additional hardware for each flow to record and enforce reservations on the fast (low latency) path through the switch. Reservation systems also require long call set up times, placing further burdens and inefficiencies on the switch.

What is needed is a scheme to rapidly identify "good" flows from "bad" (i.e., the well-behaved flows vs. the non-adapting aggressive flows) on a packet-by-packet basis and to adaptively limit the throughput rate of the bad flows.

SUMMARY

Each packet of an input flow is mapped (e.g., hashed) to an entry in a (typically) unique flow table for each output queue. The mapping is based on a subset of the fields within the packet's header, giving (due to the small size of the flow table relative to the number of unique combinations of packet header bits) an approximation of a per-flow management system. Each flow table entry contains at least a credit value. On packet reception, the credit value is tested against zero to ascertain if any credits remain; if not (i.e., credits=zero), the packet is dropped. Otherwise, the packet size is compared to the credit value. If the size is less than or equal to the credit value, the credit value is decremented by the packet size and processing proceeds according to conventional methods, including but not limited to those disclosed in the co-pending DBL Application. If, however, the packet size is greater than the available number of credits, the credit value is set to zero and the packet is dropped.

A periodic task, executing in the router/switch controller, adds credits to each flow table entry (or "bucket") up to a predetermined maximum corresponding to the allowed maximum rate for the flow in question. The processing rate of each approximated flow (i.e., approximated by the packet mapping) is thus maintained to the rate determined by the number of credits present at each enqueuing decision, up to the allowed maximum.

The scheme operates independently of packet flow type, providing packet-specific means for rapidly discriminating well-behaved flows from aggressive, non-adapting flows and managing throughput bandwidth accordingly. The present invention handles robust, well-behaved flows that adapt to congestion situations signaled by packet drop, fairly sharing bandwidth among these flows. The present invention also ensures good service for fragile flows (those sending few packets and those of a time critical nature) such as Voice-over-Internet Protocol (VoIP), thereby protecting them from non-adapting aggressive flows as well.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates similar or identical items.

DETAILED DESCRIPTION

Overview

The present Application discloses a rate limit scheme, using actual flow data rate requirements rather than type/class of service identifiers, that adapts to varying traffic. This scheme prevents unauthorized use of and denial of service attacks on internetworking systems by malevolent users utilizing flow behavior and data rate to control the bandwidth of all flows in a queue. The present invention also avoids the high resource and setup overhead costs associated with true per-flow control by using an approximated flow control method. The present invention ensures good service for fragile voice flows (those sending few packets and those of a time critical nature) such as Voice-over-Internet Protocol (VoIP), thereby protecting them from non-adapting aggressive flows.

In one embodiment of the present invention, a voice flow is assigned to a queue given high priority in order to give voice flows low latency and high immunity from packet drops. The rate-limiting flow table of the present invention is employed to prevent NAFs and aberrant flows masquerading as voice from overwhelming the high priority voice queue and/or causing starvation of other flows through the switch.

Although the terms switch and/or router will be used generally in this specification, those skilled in the art will realize that other related internetworking devices may be used, in addition to routers or switches, to perform analogous functions. Accordingly, the invention is not limited to any particular type of internetworking device, router, or switch. Also, although the primary focus of the 15 current invention is Internet Protocol (IP) packet flows, those skilled in the art will realize that protocols and flows other than IP can be benefit from the present invention and its alternate embodiments. Accordingly, the invention is not limited to any particular type of protocol or packet format.

Figure 1:
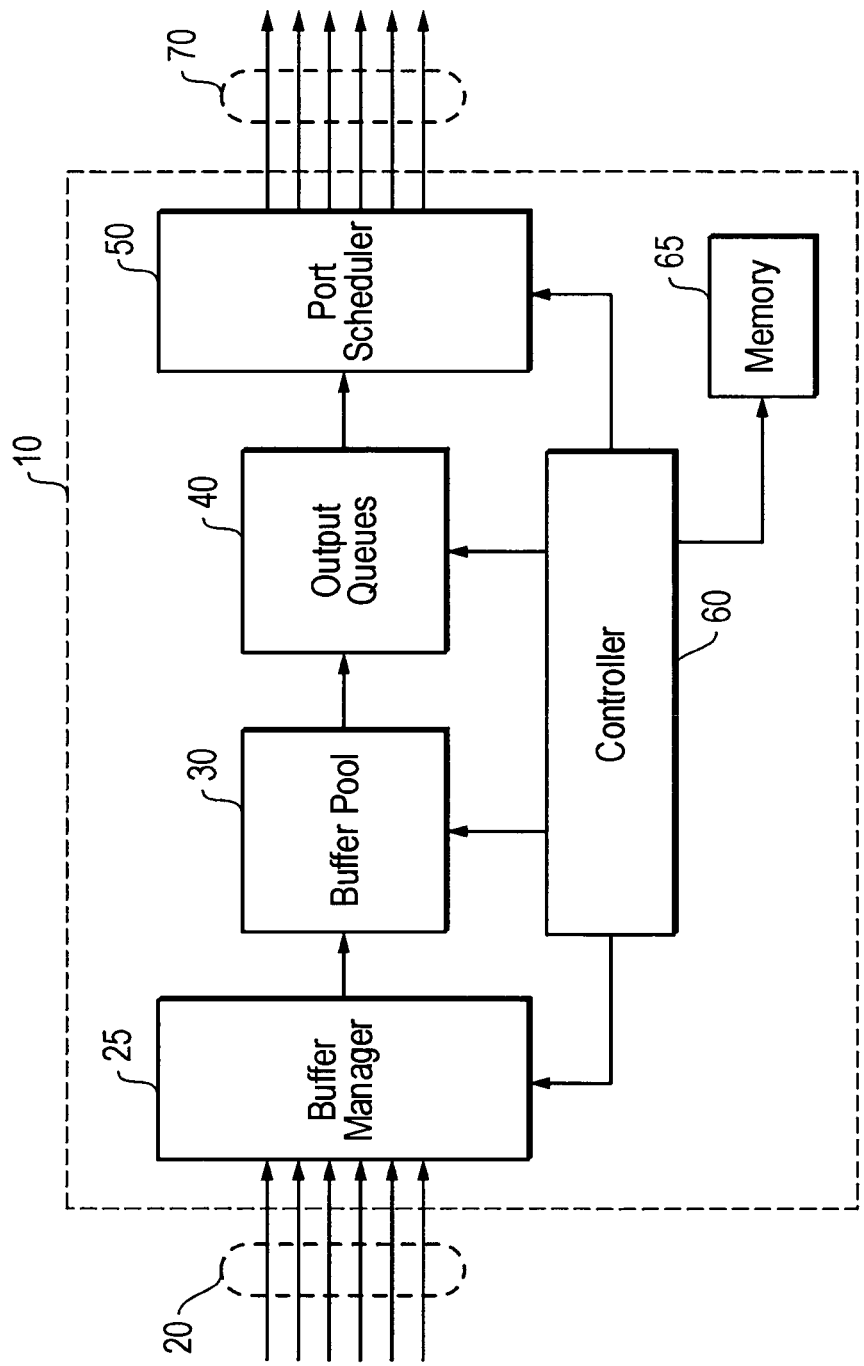
FIG. 1 is a high-level schematic representation of a router/switch device that contains prior art circuitry or the circuitry/process of the present invention.

Although the circuit of FIG. 1 has been described as prior art, FIG. 1 may also be used to illustrate a router/switch device incorporating the present invention.

A hash mapping of packet header information is used in one embodiment to approximate the per-flow buffer state by storing a buffer count for each flow into a flow table entry (or "bucket"), rather than storing the buffer count into a unique location for every flow. The per-flow approximation of the hash table concept avoids the per-flow lookup, set up, and tear down overhead of prior art queue-based management schemes.

According to one embodiment of the present invention, each flow entry (or bucket) comprises at least a credit field having a certain value. When a packet arrives, the credit value is tested against zero. If credits remain, the credit value is tested against the number of cells in the packet. The packet is dropped if there are not enough credits in the bucket. Specifically, if the result of a decrement of the credit value by the size of the packet (in cells) is a negative value, the packet is ignored and not enqueued; the credit value is set to zero. Otherwise, the credit value is decremented by the number of cells and processing of the packet proceeds according to conventional methods.

The term "cells" used here refers to the minimum unit of measurement of data storage in the router/switch and is typically a unit larger than a byte. (This unit is also sometimes referred to as "buffer elements" in the literature). Units of packets are not recommended as packet size can vary enormously. Likewise, units of bytes are not recommended because too many bits would be required in the flow table to keep the count field. Testing has shown that units (denoted cells) of 64 byte groups reduce the bits required by six places and yet provide a more accurate count (over units of packets) with minimal inefficiencies. Persons of ordinary skill in the art will of course recognize that other units are possible. Reference herein to counting units of "buffers" or "cells" is not intended to limit the present invention to any one particular unit size.

In order that the credits for all flows do not eventually run out, a periodic update process cyclically accesses each flow table bucket and adds a predetermined increment of credits to each credit value, discussed further below.

In one embodiment, all queues for a given output (transmit) port are managed with the help of the approximated per-flow rate limiting scheme of the present invention. In an alternate embodiment, one queue per output port is reserved for voice flows and only that queue is managed according to the approximated per-flow rate limiting scheme.

After adaptive rate limiting is applied to the enqueuing decision, processing of enqueued cells proceeds normally, in accordance with conventional means, including but not limited to that of the co-pending DBL Application incorporated by reference in its entirety and further described below.

Figure 2:
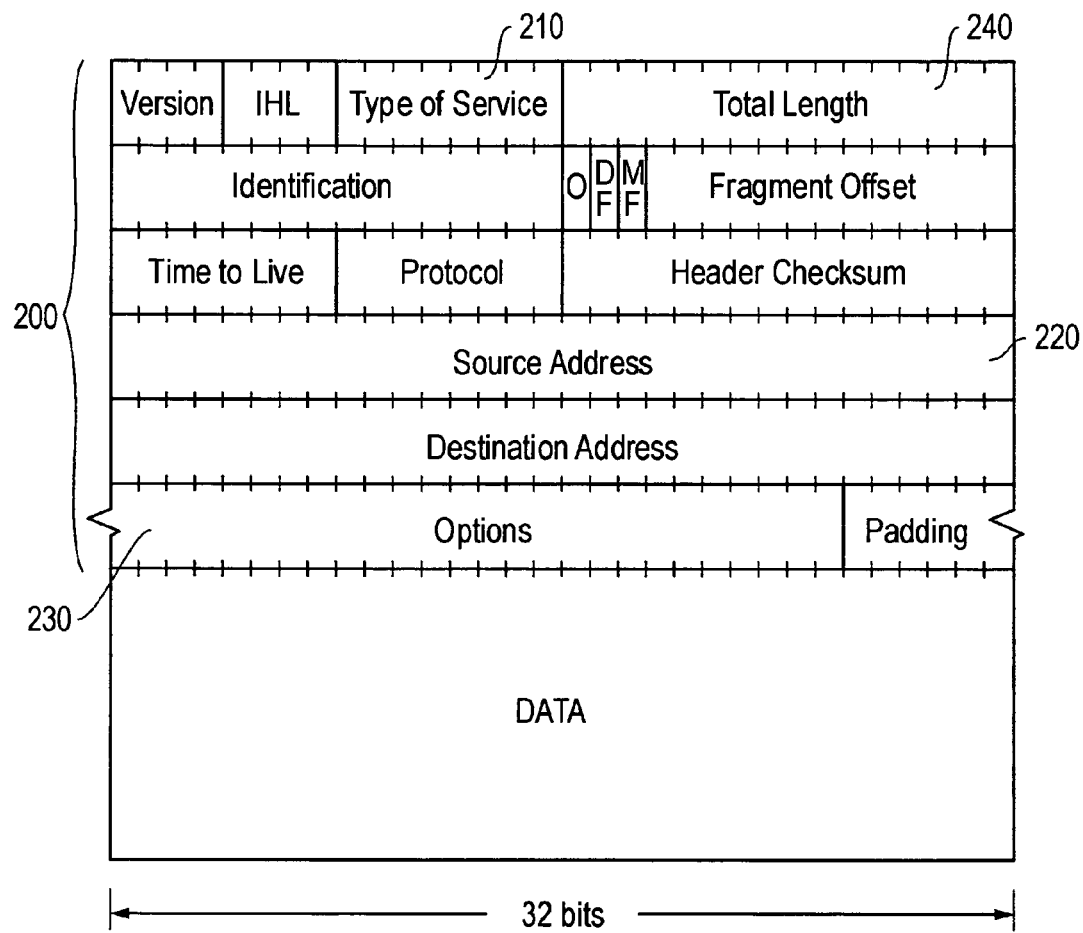
FIG. 2 is a bitmap of a prior art Internet Protocol (IP) packet showing the fields within its header.
Figure 3:
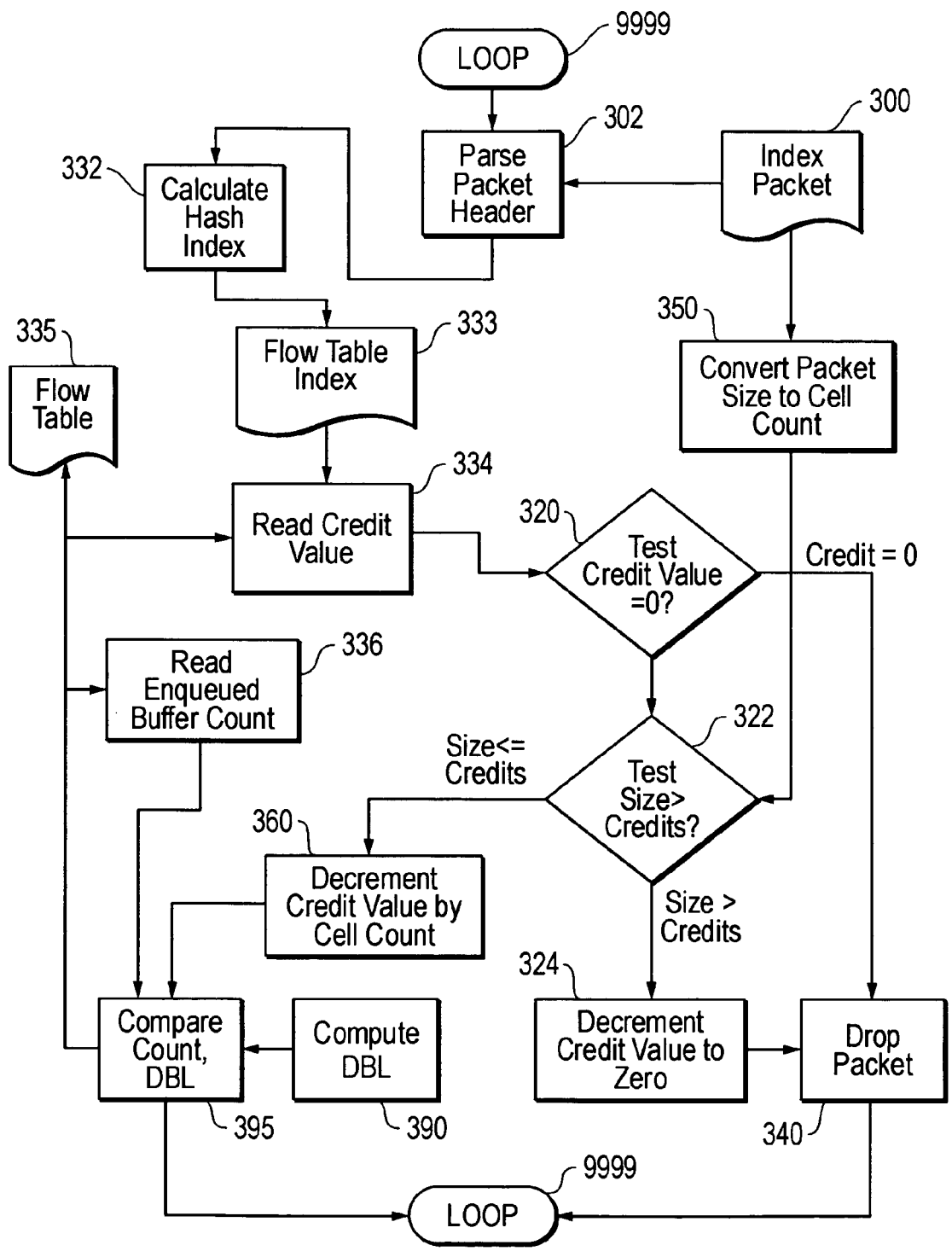
FIG. 3 is a flow chart of one embodiment of present invention.

FIG. 3 illustrates the high-level process of the current invention, specifically focused on the computations and transformations of the rate limiting and enqueuing operations. Upon receipt of a packet in a given flow, 300, the packet header is parsed 302 to determine the packet size, flow label, and classification (e.g., Voice-over-IP [VoIP]). Refer to FIG. 2 for the bitwise locations of this information within the industry-standard IP packet header 200. All steps in the process of the present invention are implemented in a conventional router or switch system well known in the art. FIG. 1 is merely one prior art implementation of a device capable of carrying out the present invention. Other examples of such systems may be found in U.S. Pat. Nos. 5,088,032, METHOD AND APPARATUS FOR ROUTING COMMUNICATIONS AMONG COMPUTER NETWORKS, to Leonard Bosack; 5,224,099, CIRCUITRY AND METHOD FOR FAIR QUEUING AND SERVICING CELL TRAFFIC USING HOPCOUNTS AND TRAFFIC CLASSES, to Corbalis, et al.; 5,359,592, BANDWIDTH AND CONGESTION CONTROL FOR QUEUE CHANNELS IN A CELL SWITCHING COMMUNICATION CONTROLLER, to Corbalis, et al.; 5,473,607, PACKET FILTERING FOR DATA NETWORKS, to Hausman et al.; and 5,561,663, METHOD AND APPARATUS FOR PERFORMING COMMUNICATION RATE CONTROL USING GEOMETRIC WEIGHTED GROUPS, to Daniel Klausmeier, incorporated in their entireties herein by reference.

Per-Flow Approximation

In a substantially parallel process, the extracted header data is transformed by calculating a hash index 332 according to the following function, expressed in the C programming language:

```
hdr_ip* iph = (hdr_ip*)pkt →        // get pointer to IP header
  access(off_ip_);                    portion of jacket
int i = (int)iph → src( );           // get source IP address
int j = (int)iph → dst( );           // get destination IP
                                        address
int k=1+j;                           // add src and dst
return (k+(k>>8)+ -(k>>4))%((2<<19)-1);  // shift, add, divide modulo
                                        a large prime
```

Alternatively, the following function can also be used to calculate hash index 332:

```
hdr_ip*iph = (hdr_ip*)pkt →         // get pointer to IP header
  access(off_ip_);                    portion of packet
int i = (int)iph → src( );           // get source IP address
int j = (int)iph → dst( );           // get destination IP address
i = i^j;                             // XOR src and dst
i^ = i>>16;                          // shift high order to low order
i^ = i>>8;                           // shift again
return i;
```

The output of this function is an index to flow table 335 for the designated output queue for the given input flow. One of ordinary skill in the art will recognize the process of computing a table lookup index based on a limited range of inputs as a generic hash function (or hashing), novel here in the choice of both input parameters and the precise hash function performed on those inputs. Such hashing may be accomplished with hardware or software means or a combination thereof, as is well known in the art.

The flow identifying information contained in the packet header (sometimes called the "flow label" in the art) is hashed in order to reduce the huge range of packet header values into a single compact, easily manipulated field having a far smaller range of values. Hashing avoids the per-flow lookup, set up, and tear down overhead of prior-art systems. For example, this embodiment of the present invention does not maintain flow table entries for each and every flow. Rather, of the $2^{160}$ possible flows uniquely identified by the first five 32-bit words in the IP packet header, the hash function limits the flow table to just $2^n$ entries, substantially less than the unhashed situation. In other words, flow table 335 consists of $2^n$ entries, where n=the number of bits in the output of the hash function above. In one embodiment, a 19 bit hash index is used, supporting 512K entries. This provides the advantage of needing fewer bits to identify a table entry corresponding to a particular flow, thus reducing the overhead and resource cost of this particular embodiment over the prior art.

For smaller network applications, such as those on an enterprise scale, a flow table of 2048 entries per queue (n=11) appears to be sufficient, implying a hash function yielding 11 bits. For larger scale internetworking, such as Internet Service Provider (ISP) backbones, flow table of 16 K to 64 K entries ($2^{14}$ to $2^{16}$ entries) should be provided to accommodate the large number of flows seen in such applications.

Although an IP packet is described, those skilled in the art will realize that datagrams or packets other than IP packets can be used. Other datagram formats are accommodated simply by determining the type of datagram received by methods 10 well-known in the art, such as reading identifying data from the header, and applying the hash function described above to the appropriate data fields. Accordingly, the invention is not limited to any particular type of datagram.

Thus, the present invention only approximates a flow-specific management scheme, because multiple flows could potentially be mapped to the same flow table hash bucket. Such a situation is referred to as a hash collision.

The effect of a hash collision is that the two flows sharing the same bucket are forced to share the rate. Thus, each flow may experience some packet drop if the sum of their rates exceeds the allowed rate for the queue. Normally, this should not be a problem for two voice flows sharing the same bucket. This is because the rate can be higher than the minimum for voice to allow for bursts, different voice encodings, and audio quality. Persistent hash collisions with a NAF are the primary concern.

Persistent hash collisions, as when two NAFs are mapped to the same bucket, will result in greater inefficiencies and unfair bandwidth allocations. Though the probability of such an event is low, due to the relative rarity of both NAFs and hash collisions themselves, such a situation is undesirable. Persistent hash collisions between flows that happen to hash into the same bucket can be avoided by periodically changing the hash seed on the hash function 332 above (referring to FIG. 3) used to compute the hash index from the packet header. In a hardware implementation of the present invention, this change of hash seed may be under software control. Periodic change of hash seed is used because there is no way to determine whether a hash collision is occurring. Detecting collisions would require keeping explicit flow state at a significant implementation, and likely performance, cost. Periodic change of hash seed is a simple and inexpensive solution.

The hash index is stored in the packet descriptor field in the output (transmit) queue for later use in transmitting the packet (not shown). The packet descriptor field also contains the packet length, rewrite information, and a pointer to the start of the data buffer for the packet.

The ability to revise the hash seed is appropriate in any case to guard against potentially anomalous behavior at a particular installation. By storing the original hash index 333 in the packet descriptor (step 420) for each packet, the enqueued buffer count is updated correctly even if the hash seed was changed between packet reception and transmission.

The above hashing scheme is one embodiment of mapping a packet in a flow to an index identifying the associated flow table entry. This mapping can also be realized by a number of other methods. As one alternative, the extracted header fields can be concatenated to form a key that is input to a content-addressable memory (CAM). If the key matches an entry in the CAM, the CAM returns the address of the first matching entry. This address can then be used directly as the index to identify the flow table entry. Alternatively, the value returned by the CAM can be used to address a second memory that provides the index to identify the flow table entry. In such an embodiment, if a key does not match in the CAM, a matching entry is allocated in the CAM and initialized. A default entry or set of entries may be selected if the CAM is full. When a flow table entry is reduced to zero buffer usage, the associated CAM entry can be recorded as free, making it available for allocation to a new flow key. The matching of the key to entry can be an exact match using a binary CAM or partial match, using a ternary CAM well-known in the art.

As a further alternative embodiment, the extracted header data can be concatenated to form a key that is input to a cache, structured as a set of N sets of k entries each. The key is hashed to one of the sets and then matched to one of the k entries in the set. The address of the matching entry can be used as the index to the flow table entry or as an address into a second memory whose addressed entry then provides the index to the flow table entry. As with the CAM embodiment above, a new cache entry is allocated and initialized when the mapping of the packet in the cache fails, and an entry in the cache is deallocated when the corresponding flow table entry goes to zero buffer usage.

Although several mapping exemplars are described, one skilled in the art will realize that mappings other than the present examples can be used. Accordingly, this invention is not limited to any particular type of extracted header data to flow table entry mapping.

Rate Limiting

The current (pre-packet reception) credit value is read 334 from the flow table bucket indexed to the current flow by hash function 332, described above, and compared to zero 320. If the number of cells in the received packet 300 (its "size") is found to be greater than the credit value ("credits") in test 322, then the credit value is set to zero 324 and the packet is dropped 340.

However, if test 322 shows size to be less than or equal to the credit value, the credit value is decremented by size (i.e. the number of cells in the packet) in step 360. The packet is then further processed according to conventional means, including but not limited to the method of the co-pending DBL Application, represented by steps "Compare Count, DBL" 395 and "Compute DBL" 390. In an embodiment utilizing the subsequent processing method of the co-pending DBL Application, the present credit field is larger and the buffer count field may be smaller than that disclosed in the co-pending DBL Application.

Otherwise, whenever the credit value is found to be zero in test 320, the packet is immediately dropped 340.

Alternatively, there can be a switch or port variable called "slack" that specifies the amount over the current credit value a packet (in cells) can go before being dropped. This alternate embodiment allows the degree of tolerance (slack) to running over the credit limit to be adjusted as a conventional switch configuration parameter by means well-known in the art. The process flow is the same as that of FIG. 3, except that "Test Size>Credits?" 322 uses, instead of "Credits", the sum of Credits+the slack value.

Periodically, and not necessarily synchronously with the above steps, the credit value for each flow table entry is updated. In one embodiment, where all flows are managed by the present adaptive rate limiting invention, all flow table entries are updated. In an alternate embodiment, where only designated voice-only flows are subject to adaptive rate limiting, only the voice flow buckets are updated. In such an embodiment, the voice flows are stored in a distinct portion of the flow table, or in an entirely separate flow table, allowing the voice flows to be identified as such. The update process consists of incrementing the credit field for each designated flow by a predetermined value.

In one embodiment, with 64-byte cells and 64 Kbps data rate for voice, a rate limit of 125 or 250 cells (allowing for partial cells), is appropriate. Assuming a 150 MHz dual-ported memory, a read and write operation of the flow table can be completed every 6.6 nanoseconds. If the switch has 48 ports and a rate of 2000 buckets per port, updating the credits every 0.5 seconds takes approximately 0.064 percent of the flow table memory bandwidth. Updating the credit field to a maximum of 250 credits each 0.5 seconds allows a data rate of approximately 256 kilobits per second, ensuring that a well-behaved flow of up to 500 cells per second will pass through without dropping due to exhaustion of its credit balance. For higher rates, the CPU could update the credits at a higher frequency.

In an alternate embodiment, a greater increment could be used to accommodate potential flow collisions inherent in the approximated per-flow mapping scheme.

As can be seen, a flow table credit field of eight bits (representing a maximum credit value of 28 or 256 cells) would be sufficient. Under this approach, a NAF would be allowed to send twice the reasonable voice data rate, but no more. Large packets, facing a limited maximum credit, would be dropped automatically. Twice the voice rate is still small compared to the total bandwidth of the link and is therefore not likely to result in untoward inefficiency. Dropping large packets is not a problem because real voice flows always come in small packets; only impostor voice flows, such as those created by bandwidth pirates and other malevolent users will be affected.

Subsequent Processing

If the packet size is less than or equal to the credit value in test 322, the credit value is decremented 360 by the packet size in cells. Packet processing then proceeds according to conventional means well-known in the art.

Alternatively, the methods and apparatus disclosed in the co-pending DBL Application, discussed above and summarized herewith, may be employed. Referring to FIG. 3, this process consists of comparing 395 the current enqueued buffer count 336 to the dynamic buffer limit 390 appropriate to the particular flow and router/switch state. Subsequent sections of this disclosure discuss the particulars of this comparison and the resultant decision to enqueue, mark, or drop the packet.

Dynamic Buffer Limit (DBL) Computation

Figure 4:
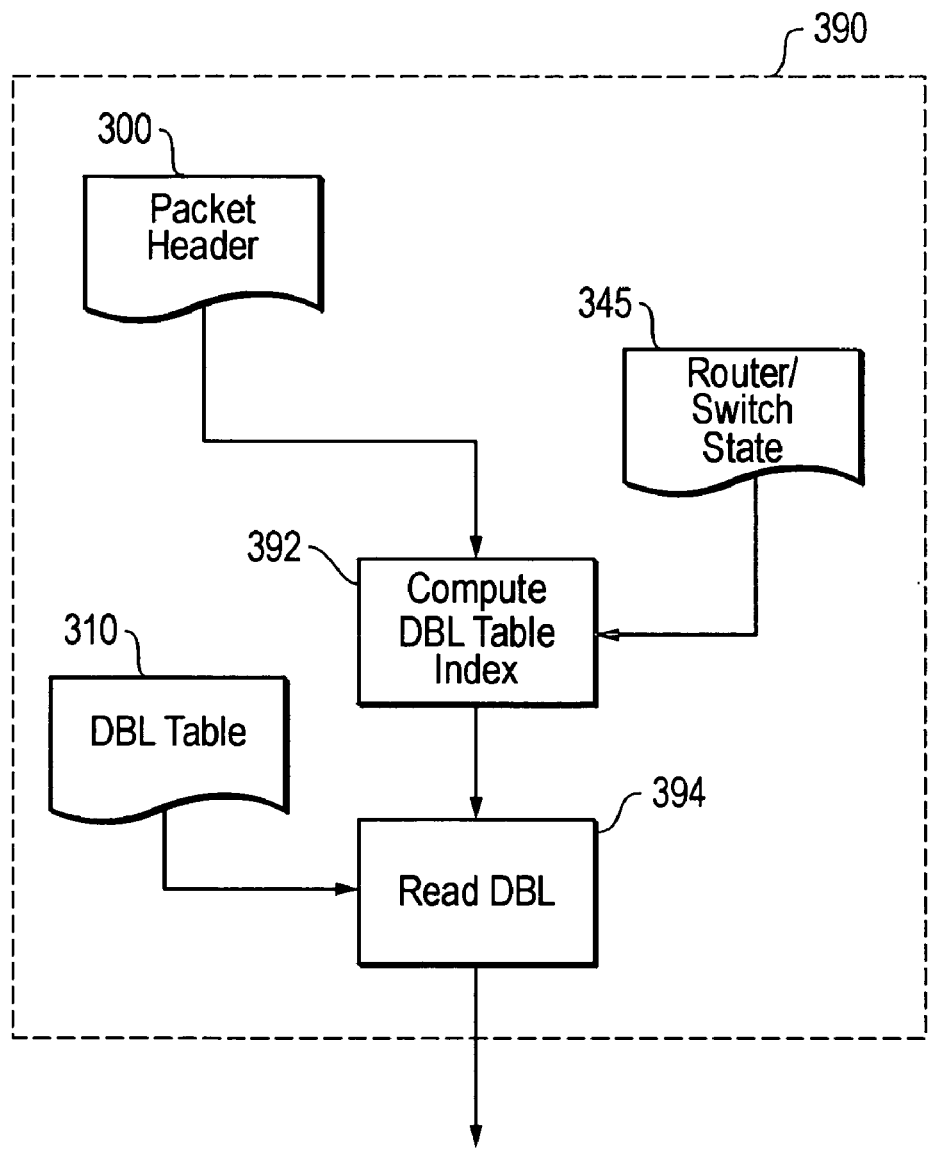
FIG. 4 is a flow chart of the process whereby the step of compute DBL value 390 of FIG. 3 is accomplished, according to one embodiment of the present invention.

The step of compute DBL 390 shown in FIG. 3 is further explained in FIG. 4. First, an index pointer into the pre-existing dynamic buffer limit (DBL) table 310 is computed, step 392, from the router/switch state parameters 345 and the contents of the input packet header 300. This computation is according to the function:

$$DBL\_index = maxQueueLen * (flowsInQueue) + currentQueueLen$$

where maxQueueLen 514 is a fixed router parameter limiting the length of any one queue, flowsInQueue is a count of the number of different flows currently in the output queue for the port, currentQueueLen is a count of the current number of cells in the queue.

Precomputation is more flexible for responding to changes because software can compute new values at any time. However, the size of the required table becomes a limitation on performance. For instance, if the table is fully indexed by flowsInQueue and currentQueueLen, and both can take on 2000 different values, the table would require 4 million entries, a substantial space cost. Thus, while a dynamic table is more flexible for changing the effective computation of the DBL, the space required is more "expensive", in terms of resources, than a particular on-the-fly computation.

Figure 6:
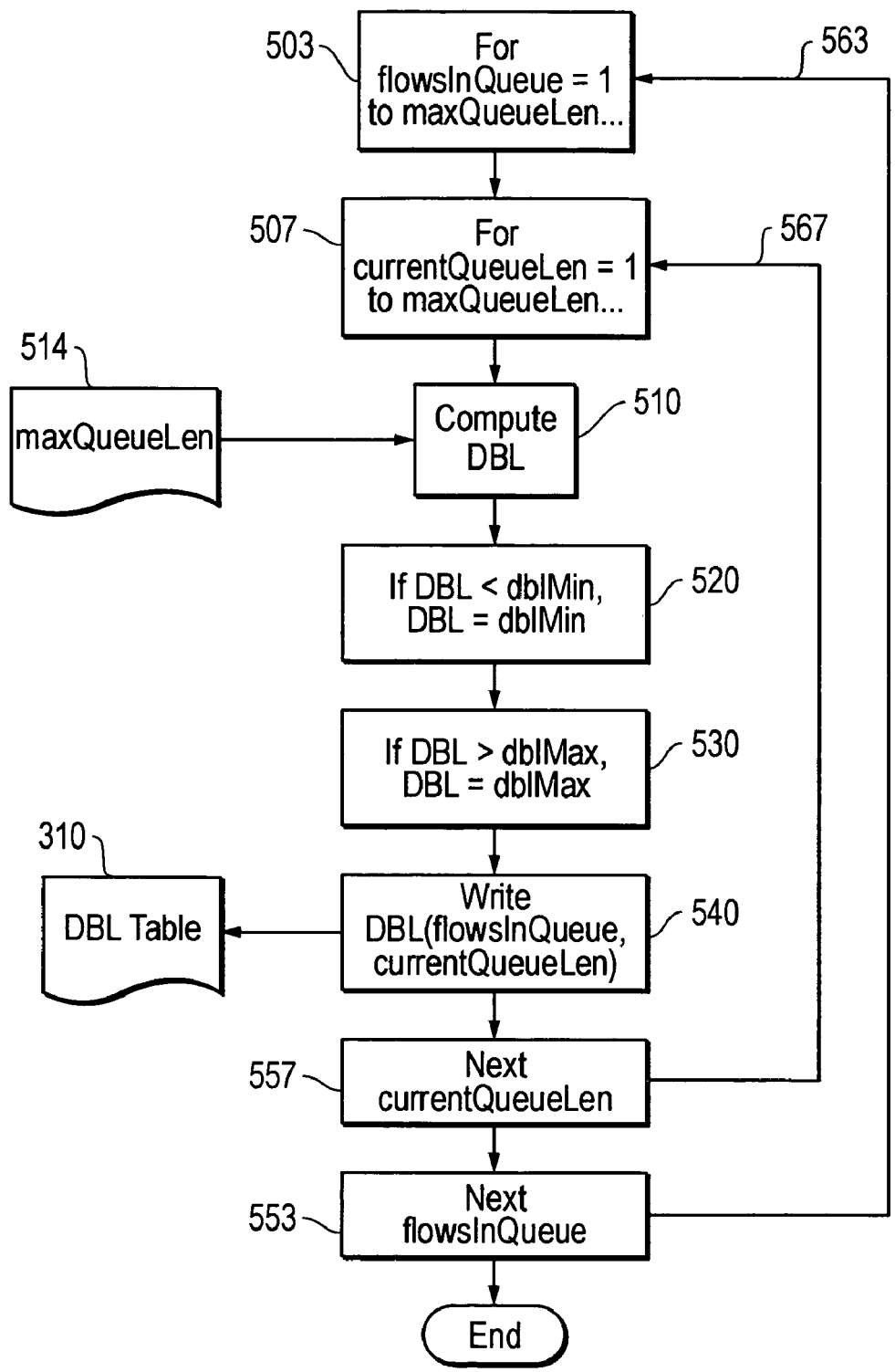
FIG. 6 is a flow chart of the process whereby DBL table 310 of FIG. 3 is created, according to one embodiment of the present invention.

In one embodiment of the present invention, DBL values are stored in a table for rapid lookup. FIG. 6 describes the process whereby the table is created and updated. For a given router/switch state 345, DBL=(maxQueueLen/flowsInQueue)×(K×maxQueueLen/currentQueueLen)

where K is a tuning parameter that adjusts DBL according to the instantaneously available queue space. This latter adjustment uses the factor maxQueueLen/currentQueueLen times tuning factor K to scale DBL, since maxQueueLen is always greater than or equal to currentQueueLen. Parameter maxQueueLen is an element of router/switch state 345.

If a table of maxQueueLen*maxQueueLen is too large, the values of currentQueueLen and flowsInQueue can be divided by some constant, such as 2, 4, or another power of 2, so that the table is large enough. With a full-sized table, this table lookup is as good as computing it on the spot, but just uses memory rather than random hardware logic or additional software instructions. As the table is reduced in size (by picking a larger constant divisor), the accuracy of the limit provided by DBL is reduced. However, similar shortcuts may be desired when fully computing DBL on each packet, because full multiplies and divides can be approximated to increase the speed and/or simplify the logic.

Computing DBL without considering available queue space would be simpler but might excessively restrict bursts of packets in a given flow when there are only one or two packet flows in the queue, i.e., flowsInQueue is small. Computing DBL without considering flowsInQueue would require DBL to ramp back too aggressively as the queue fills, given that it would not be able to distinguish whether it is a small number of large flows or a large number of small flows that is causing the congestion.

User-specified parameters dblMin and dblMax, referring to steps 520 and 530, are provided to constrain DBL to the range of values between dblMin and dblMax, independent of the above-computed value 510. The parameter dblMin protects fragile flows from dropping. A fragile flow is a flow that sends at a very low rate, such as VoIP or a Telnet session or the flow of TCP acknowledgment packets in the opposite direction to the data flow. Such a flow sends less than dblMin packets in the time required to empty the maximum length queue. For example, with dblMin=2, a queue length of 2,048 entries, a 1 Gigabit per second (Gbps) port and assuming an average packet size of 300 bytes, a fragile flow would be any flow having a data rate of less than 600 Kilobits per second (Kbps).

A dblMin value of 2 for appears to be desirable for fragile flows of the type discussed in D. Lin and R. Morris, *Dynamics of Early Detection*, SIGCOMM '97, Cannes, France (Lin & Morris). Parameter dblMax simply prevents DBL from taking on unnecessarily large values; it should be substantially smaller than maxQueueLen. This prevents the queue from becoming over-committed to a single flow during a lull in other traffic.

The process of filling DBL table 310 is a multi-variable loop. Since every queue is limited in length to maxQueueLen 514 cells, in its most congested state, a queue can have up to maxQueueLen flows, given one cell per flow. Accordingly, flowsInQueue ranges from 1 to maxQueueLen and currentQueueLen ranges from 1 to maxQueueLen. Thus, DBL table 310 consists, in worst case, of a maxQueueLen by maxQueueLen array, indexed by flowsInQueue and currentQueueLen.

Filling DBL table 310 begins by initiating for-next loop 563 for variable flowsInQueue 503 and for-next loop 567 for variable currentQueueLen 507. For each instance of (flowsInQueue, currentQueueLen), a DBL is computed, 510. Each DBL is tested against dblMin or dblMax as described above. The resulting value of DBL, limited to dblMin or dblMax as appropriate, is written 540 to DBL table 310 at the location indexed by (flowsInQueue, currentQueueLen). Variable currentQueueLen is incremented 557 and inner loop 567 repeats until variable currentQueueLen=maxQueueLen. At that time, variable flowsInQueue is incremented 553 and table filling proceeds on outer loop 563 until the entire table is filled.

Figure 7:
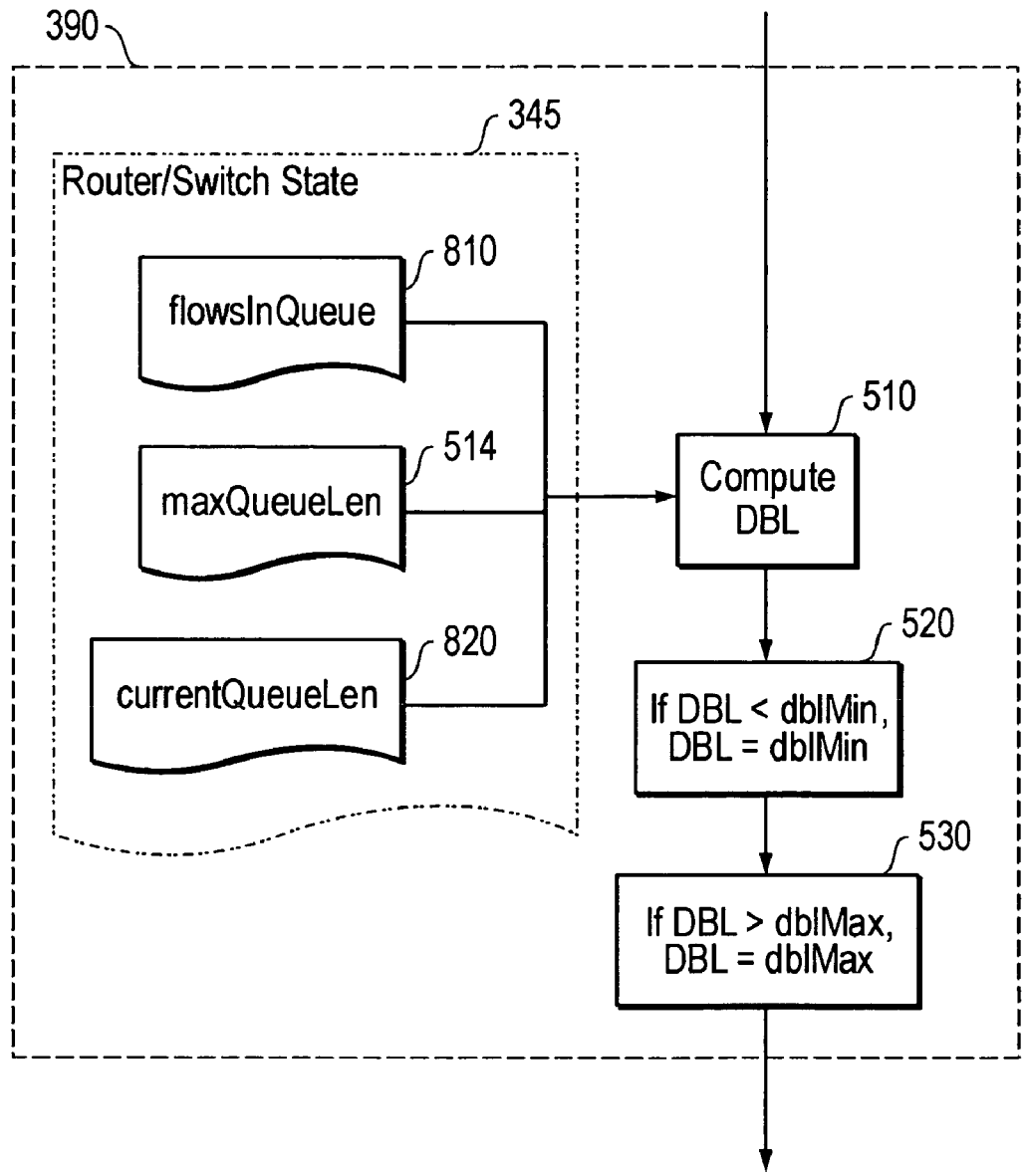
FIG. 7 is an alternate embodiment of the step of get DBL value 390 of FIG. 3.

Alternatively, the DBL value can be computed on the fly for each packet. FIG. 7 illustrates this process. The same formula 510, with dblMin and dblMax tests 520 and 530 described above, is used to compute 390 the DBL for a given queue at any instant in time. However, maxQueueLen 514, flowsInQueue 810, and currentQueueLen 820 are all read directly from router/switch state 345.

Enqueue/Tag Decision

Figure 5:
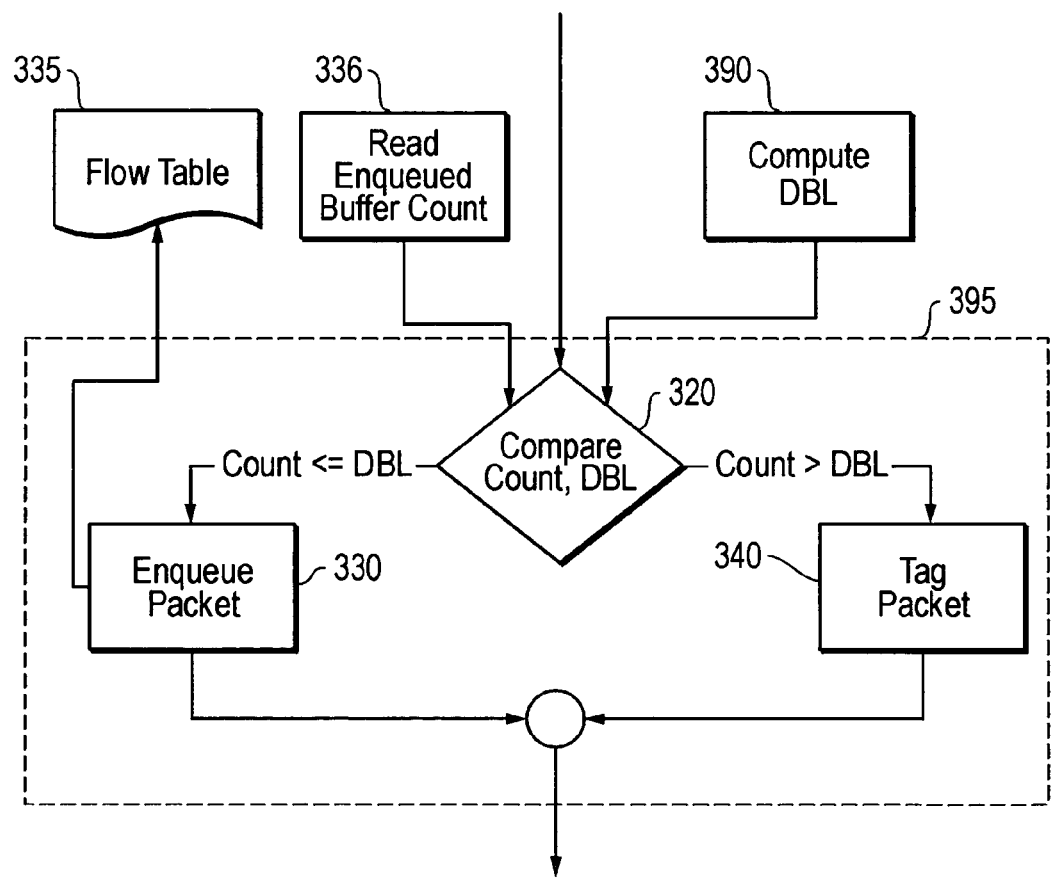
FIG. 5 is a flow chart of the process whereby the step of compare count, DBL 395 of FIG. 3 is accomplished, according to one embodiment of the present invention.

Referring now to FIG. 5, once the DBL appropriate to the received packet is determined 390, the current (pre-enqueuing) buffer count for the flow is compared 320 to DBL. The current count is retrieved 336 from the flow table bucket indexed to the current flow by hash function 332 (FIG. 3), described above. If the buffer count is greater than DBL, the packet is tagged for further processing 340. Otherwise, whenever the buffer count is less than or equal to DBL, the packet is enqueued 330.

Enqueuing

Figure 8:
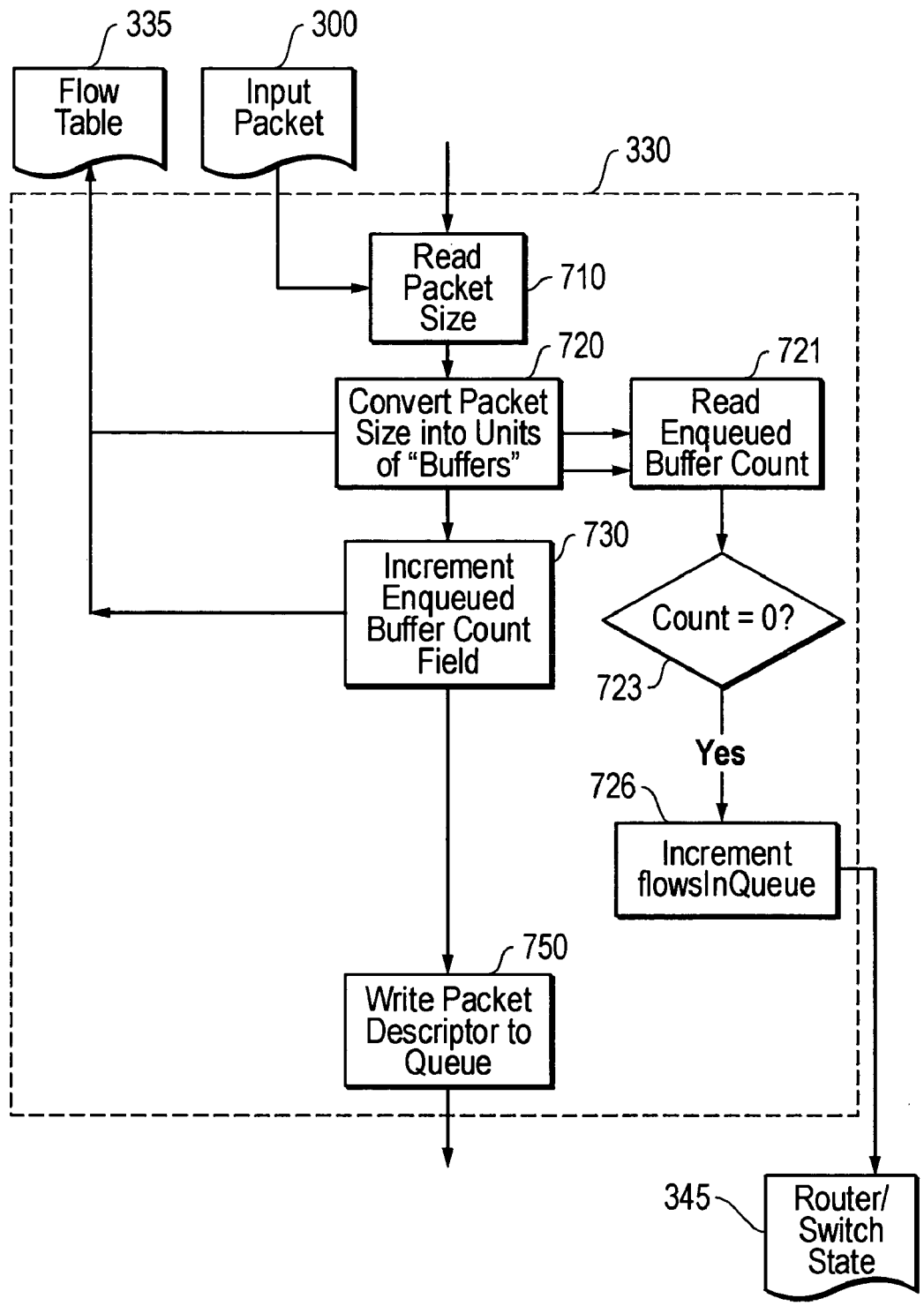
FIG. 8 is flow chart of the process whereby the step of enqueue packet 330 of FIG. 3 is accomplished, according to one embodiment of the present invention.

When enqueuing, referring to FIG. 8, the buffer count stored in the indexed flow table entry is incremented by the packet's buffer requirement, which is simply the packet size 240 (FIG. 2), read from header 710 and converted into buffer cell units 720 (simply referred to as "buffers" or more simply, "cells") as discussed above. If the buffer count is zero initially 723, the router state parameter flowsInQueue is incremented by one, 726, denoting a new flow.

Tagging

Figure 9:
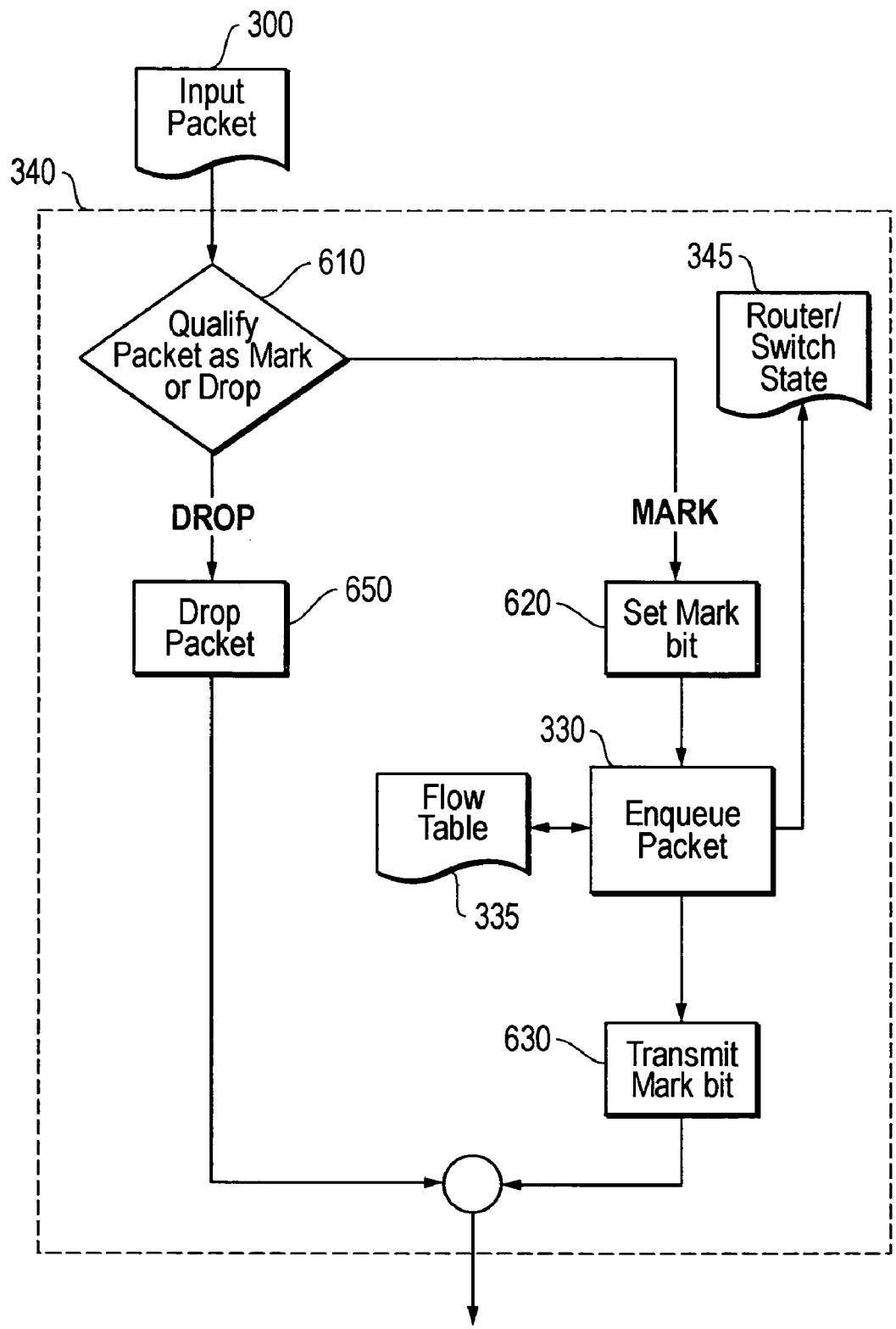
FIG. 9 is flow chart of the process whereby the step of tag packet 340 of FIG. 3 is accomplished, according to one embodiment of the present invention.

If the packet is tagged 340, in one embodiment of the present invention it is dropped, i.e., not enqueued and therefore not later transmitted to the destination address. In an alternate embodiment, referring to FIG. 9, tagged packets are not dropped immediately, but tested, 610, first. If the packet qualifies for marking and enqueuing, a mark bit is set 620 in the packet header (such as in the TOS field 210 or options field 230, FIG. 2) and the packet is enqueued 330 normally as shown in FIG. 8 and described above. The mark bit tells subsequent recipients of the packet, be they other routers or switches in the network or the packet's ultimate destination, that the packet passed through congestion. Such a bit setting marking method is similar to using the Explicit Congestion Notification (ECN) bit in the proposed IP version 6 (IPv6).

Alternatively, a backchannel message can be sent to the source address to indicate that congestion is beginning to occur and that the source should consider ramping back its flow. Backchannel messages may be sent using the well-known Internet Control Message Protocol (ICMP), for example.

If, however, the packet does not qualify for marking in step 610, it is dropped 650.

In a further alternate embodiment, whether a tagged packet is subsequently dropped is determined probabilistically, i.e., by random selection.

In a still further embodiment, a tagged packet may be forwarded to another software process for additional action instead of being dropped or marked/enqueued.

Transmission of Enqueued Packets

Figure 10:
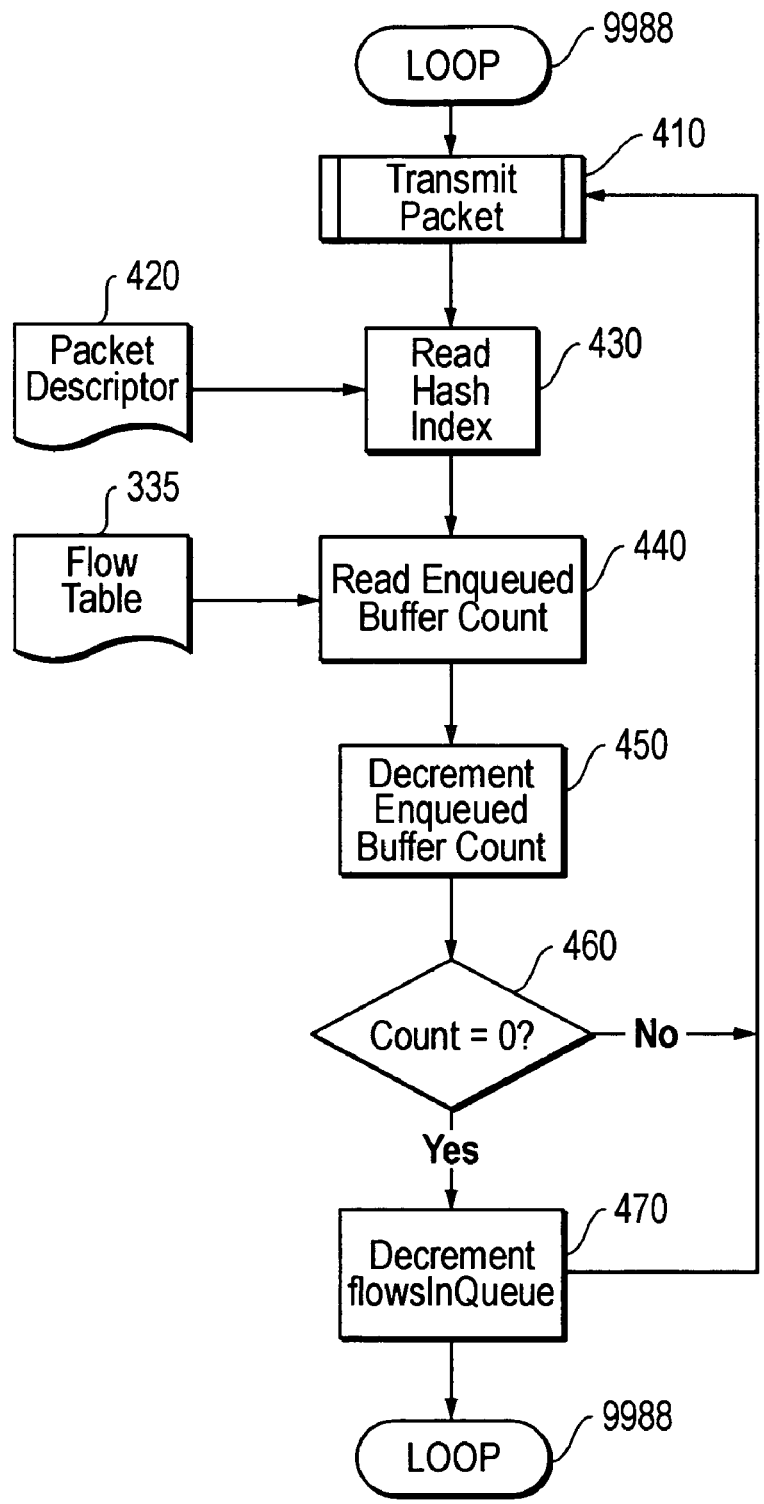
FIG. 10 is flow chart of the process whereby data is read out of the queue and transmitted out into the network, according to one embodiment of the present invention.

Of course, all routers and switches must also transmit the data they receive. Referring to FIG. 1, the packet data is read out from the output queue 40 assigned to each output port 70 in a manner well-known in the art. FIG. 10 shows the steps within the transmission process according to one embodiment of the present invention and more particularly described below.

First, packet descriptor 420 for the next packet to transmit is read from the transmit (output) queue. The packet descriptor contains the address of the actual packet data to transmit. The hash index, or whatever index is used to record the mapping used to approximate per-flow management, stored in the packet descriptor is read 430 to enable access to flow table 335. As discussed above, this step is necessary in order to correctly read the appropriate hash bucket, since the hash seed may have changed. Any attempt to re-hash the packet's header with a different hash seed will result in an erroneous flow table index value.

The enqueued buffer count field stored in the hash bucket is read 440 and decremented 450 by the appropriate number of buffer cells representing the size of the transmitted packet. Recall again that the count of buffers stored in the flow table and the number of buffers in the enqueued packet are expressed in the same units, be they bytes or cells.

If the enqueued buffer count field reaches zero, then no more packets from that flow remain in queue. Accordingly, test 460 checks the post-decrement count and decrements 470 the router state variable flowsInQueue if count is zero. The process loops, 9988, as long as there are packets in queue for transmit.

Using the foregoing, a Voice-over-IP flow can be additionally protected against packet drop and given very low latency forwarding. In an alternate embodiment of the present invention, all VoIP flows are mapped to a special output queue that has a very high transmission priority. This special output queue has its own unique approximated per-flow rate limiting flow table configured according to the present disclosure. VoIP flows are thus isolated from other flows in the switch by the separate, higher priority queue and distinctly higher rate limits, which enable higher throughput in the designated output queue.

Performance

A queue does not risk starvation or monopolization by misbehaving voice flows (i.e., NAFs) except when there are an enormous number of low-rate flows. Moreover, a non-voice flow masquerading as voice is regulated to operate like any other voice flow, so it cannot cause problems for the switch or other flows.

Approximated per flow rate limiting is especially compelling in distributed switching applications where multiple sources, including voice and non-voice flows, can be feeding traffic to the same output port. While each source sees an equal fraction of the port's bandwidth, only those sources employing the adaptive rate limiting scheme of the present invention will be able to efficiently utilize that resource when faced with NAFs.

The present scheme requires no set up or reservations through the switch or any careful, fool-proof identification of voice flows, avoiding the cost, complexity, and scaling problems of the prior art, such as Resource Reservation Protocol (RSVP) and similar schemes, mentioned above. In particular, the creation and tear down of new voice flows requires no switch controller 60 (referring to FIG. 1) actions or intervention, minimizing the demands on controller resources. This scheme is relatively simple to implement in conventional internetworking controller hardware using standard high-speed memory for the flow table, simple hardware hash computation, and a low rate periodic refresh process to increment the credit values. The latter two elements may be implemented in software as well.

CONCLUSION

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

I claim:

1. A method comprising:
   extracting at least one field from a data packet, wherein said at least one field comprises a source address field and a destination address field;
   determining a flow table index value using said at least one field, wherein
      said determining said flow table index value comprises combining said source address field and said destination address field to form said flow table index;
   identifying a flow table entry using said flow table index value, wherein said flow table entry comprises
      a first field comprising a rate credit value, and
      a second field comprising a buffer count value;
   determining a subsequent processing status of said data packet by comparing said rate credit value with zero;
   dropping said data packet without further processing when said comparison indicates that said rate credit value is zero; and
   processing said packet using said rate credit value and said buffer count value only when said rate credit value has a non-zero value as determined by said comparison.

2. The method of claim 1, wherein
   said rate credit value represents a transfer rate of a flow associated with said flow table entry, and
   said buffer count value represents quantity of memory space allocated to said flow associated with said flow table entry.

3. The method of claim 2, further comprising:
   periodically incrementing said credit value by an increment.

4. The method of claim 3, wherein said periodically incrementing comprises:
   periodically incrementing said credit value by an increment up to a predetermined maximum value.

5. The method of claim 1, wherein
   said at least one field comprises a set of fields, and
   said determining said flow table index value comprises determining said flow table index value using a subset of said set of fields.

6. The method of claim 1, wherein
   said flow table index value belongs to a first set of values, and
   a maximum number of values in said first set of values is less than a maximum number of possible flows.

7. The method of claim 1, wherein said combining comprises at least one of:
- adding said source address field to said destination address field;
- performing an exclusive OR (XOR) operation using said source address field and said destination address field as operands; and
- adding said source address field to said destination address field to form a sum and performing a bit-wise shift operation on at least a portion of said sum.

8. The method of claim 1, wherein
said at least one field comprises a plurality of fields, and
said determining said flow table index value comprises at least one of
- hashing data of said plurality of fields, and
- concatenating data of said plurality of fields.

9. The method of claim 1, further comprising:
performing said determining, said identifying, and said processing in response to a determination that data packet comprises a voice packet.

10. The method of claim 9, wherein said identifying a flow table entry comprises:
identifying a flow table entry within a voice flow table.

11. The method of claim 9, wherein said identifying a flow table entry comprises:
identifying a flow table entry within a voice portion of a flow table.

12. The method of claim 1, wherein said processing comprises at least one of:
- enqueuing said data packet;
- modifying said data packet; and
- dropping said data packet.

13. The method of claim 12, wherein said processing further comprises:
- comparing a size value associated with said data packet to said rate credit value; and
- comparing said buffer count value to a buffer limit value.

14. The method of claim 13, wherein said processing further comprises:
dropping said data packet in response to a determination that said buffer count value is greater than said buffer limit value.

15. The method of claim 13, wherein said processing further comprises:
dropping said data packet in response to a determination that said size value associated with said data packet is greater than said rate credit value.

16. The method of claim 13, further comprising:
decrementing said rate credit value by said size value associated with said data packet in response to a determination that said size value associated with said data packet is less than or equal to said rate credit value.

17. The method of claim 12, wherein said processing further comprises:
- comparing a size value associated with said data packet to said rate credit value;
- determining a buffer limit value in response to said comparing said size value associated with said data packet to said rate credit value; and
- comparing said buffer count value to said buffer limit value in response to said determining said buffer limit value.

18. The method of claim 17, wherein said determining said buffer limit value comprises:
determining a buffer limit value in response to a determination that said size value associated with said data packet is less than or equal to said rate credit value.

19. The method of claim 18, wherein said determining said buffer limit value further comprises:
determining a reduced buffer limit in response to a determination that said size value associated with said data packet is greater than said rate credit value.

20. An apparatus comprising:
means for extracting at least one field from a data packet, wherein
said at least one field comprises a source address field and a destination address field;
means for determining a flow table index value using said at least one field, wherein
said means for determining said flow table index value comprises means for combining said source address field and said destination address field to form said flow table index;
means for identifying a flow table entry using said flow table index value, wherein said flow table entry comprises
a first field comprising a rate credit value, and
a second field comprising a buffer count value;
means for determining a subsequent processing status of said data packet comprising means for comparing said rate credit value with zero;
means for dropping said data packet without further processing when said means for comparing indicates that said rate credit value is zero; and
means for processing said packet using said rate credit value and said buffer count value only when said rate credit value has a non-zero value as determined by said means for comparing.

21. The apparatus of claim 20, wherein
said rate credit value represents a transfer rate of a flow associated with said flow table entry, and
said buffer count value represents quantity of memory space allocated to said flow associated with said flow table entry.

22. The apparatus of claim 21, further comprising:
means for periodically incrementing said credit value by an increment.

23. The apparatus of claim 22, wherein said means for periodically incrementing comprises:
means for periodically incrementing said credit value by an increment up to a predetermined maximum value.

24. The apparatus of claim 22, wherein
said at least one field comprises a set of fields, and
said means for determining said flow table index value comprises means for determining said flow table index value using a subset of said set of fields.

25. The apparatus of claim 22, wherein
said flow table index value belongs to a first set of values, and
a maximum number of values in said first set of values is less than a maximum number of possible flows.

26. The apparatus of claim 22, wherein said means combining comprises at least one of:
- means for adding said source address field to said destination address field;
- means for performing an exclusive OR (XOR) operation using said source address field and said destination address field as operands; and
- means for adding said source address field to said destination address field to form a sum and performing a bit-wise shift operation on at least a portion of said sum.

27. The apparatus of claim 22, wherein
said at least one field comprises a plurality of fields, and said means for determining said flow table index value comprises at least one of
means for hashing data of said plurality of fields, and
means for concatenating data of said plurality of fields.

28. The apparatus of claim 20, further comprising:
means for performing said determining, said identifying, and said processing in response to a determination that data packet comprises a voice packet.

29. The apparatus of claim 28, wherein said means for identifying a flow table entry comprises:
means for identifying a flow table entry within a voice flow table.

30. The apparatus of claim 28, wherein said means for identifying a flow table entry comprises:
means for identifying a flow table entry within a voice portion of a flow table.

31. The apparatus of claim 22, wherein said means for processing comprises at least one of:
means for enqueuing said data packet;
means for modifying said data packet; and
means for dropping said data packet.

32. The apparatus of claim 31, wherein said means for processing further comprises:
means for comparing a size value associated with said data packet to said rate credit value; and
means for comparing said buffer count value to a buffer limit value.

33. The apparatus of claim 32, wherein said means for processing further comprises:
means for dropping said data packet in response to a determination that said buffer count value is greater than said buffer limit value.

34. The apparatus of claim 32, wherein said means for processing further comprises:
means for dropping said data packet in response to a determination that said size value associated with said data packet is greater than said rate credit value.

35. The apparatus of claim 32, further comprising:
means for decrementing said rate credit value by said size value associated with said data packet in response to a determination that said size value associated with said data packet is less than or equal to said rate credit value.

36. The apparatus of claim 31, wherein said means for processing further comprises:
means for comparing a size value associated with said data packet to said rate credit value;
means for determining a buffer limit value; and
means for comparing said buffer count value to said buffer limit value.

37. The apparatus of claim 36, wherein said means for determining said buffer limit value comprises:
means for determining a buffer limit value in response to a determination that said size value associated with said data packet is less than or equal to said rate credit value.

38. The apparatus of claim 37, wherein said means for determining said buffer limit value further comprises:
means for determining a reduced buffer limit in response to a determination that said size value associated with said data packet is greater than said rate credit value.

39. A computer-readable storage medium having embodied therein a plurality of instructions executable by a computer, wherein said plurality of instructions when executed cause said computer to perform a method comprising:
extracting at least one field from a data packet, wherein said at least one field comprises a source address field and a destination address field;
determining a flow table index value using said at least one field, wherein
said determining said flow table index value comprises combining said source address field and said destination address field to form said flow table index;
identifying a flow table entry using said flow table index value, wherein said flow table entry comprises
a first field comprising a rate credit value, and
a second field comprising a buffer count value;
determining a subsequent processing status of said data packet by comparing said rate credit value with zero;
dropping said data packet without further processing when said comparison indicates that said rate credit value is zero; and
processing said packet using said rate credit value and said buffer count value only when said rate credit value has a non-zero value as determined by said comparison.

40. The computer-readable storage medium of claim 39, wherein
said rate credit value represents a transfer rate of a flow associated with said flow table entry, and
said buffer count value represents quantity of memory space allocated to said flow associated with said flow table entry.

41. The computer-readable storage medium of claim 40, wherein
said flow table index value belongs to a first set of values, and
a maximum number of values in said first set of values is less than a maximum number of possible flows.

42. The computer-readable storage medium of claim 40, wherein said processing further comprises:
comparing a size value associated with said data packet to said rate credit value;
determining a buffer limit value in response to said comparing said size value associated with said data packet to said rate credit value; and
comparing said buffer count value to said buffer limit value in response to said determining said buffer limit value.

43. The computer-readable storage medium of claim 42, wherein said determining said buffer limit value comprises:
determining a buffer limit value in response to a determination that said size value associated with said data packet is less than or equal to said rate credit value.

44. The computer-readable storage medium of claim 43, wherein said determining said buffer limit value further comprises:
determining a reduced buffer limit in response to a determination that said size value associated with said data packet is greater than said rate credit value.

45. A data processing system comprising:
a buffer manager configured to receive a data packet; and
a controller coupled to said buffer manager and configured to, extract at least one field from a data packet, wherein said at least one field comprises a source address field and a destination address field;
determine a flow table index value using said at least one field, wherein
said determining said flow table index value comprises combining said source address field and said destination address field to form said flow table index;
identify a flow table entry using said flow table index value, wherein said flow table entry comprises
a first field comprising a rate credit value, and
a second field comprising a buffer count value;

determine a subsequent processing status of said data packet by being configured to compare said rate credit value with zero;

drop said data packet without further processing when said comparison indicates that said rate credit value is zero; and process said packet using said rate credit value and said buffer count value only when said rate credit value has a non-zero value as determined by said comparison.

46. The data processing system of claim 45, wherein said rate credit value represents a transfer rate of a flow associated with said flow table entry, and said buffer count value represents quantity of memory space allocated to said flow associated with said flow table entry.

47. The data processing system of claim 46, wherein said flow table index value belongs to a first set of values, and a maximum number of values in said first set of values is less than a maximum number of possible flows.

48. The data processing system of claim 46, wherein said controller is further configured to, compare a size value associated with said data packet to said rate credit value;

determine a buffer limit value; and compare said buffer count value to said buffer limit value.

49. The data processing system of claim 48, wherein said controller is further configured to, determine a buffer limit value in response to a determination that said size value associated with said data packet is less than or equal to said rate credit value.

50. The data processing system of claim 49, wherein said controller is further configured to, determine a reduced buffer limit in response to a determination that said size value associated with said data packet is greater than said rate credit value.

51. The method of claim 1, wherein said determining comprises:

using said at least one field as an input to a hash function; and determining said flow table index value as an output of said hash function.

52. The method of claim 51, further comprising:

periodically changing a seed value of said hash function.

53. The apparatus of claim 20, wherein said means for determining comprises:

means for hashing said at least one data field using a hash function to obtain said flow table index value.

54. The apparatus of claim 53, further comprising:

means for periodically changing a seed value of said hash function.

55. The data processing system of claim 45, wherein said controller is configured to determine said flow table index value by hashing said at least one field using a hash function.

56. The data processing system of claim 55, wherein said controller is further configured to periodically change a seed value of said hash function.

* * * * *

UNITED STATES PATENT AND TRADEMARK OFFICE
CERTIFICATE OF CORRECTION

PATENT NO. : 7,630,312 B1
APPLICATION NO. : 10/827068
DATED : December 8, 2009
INVENTOR(S) : David R. Cheriton Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1281 days.

Signed and Sealed this

Twenty-first Day of December, 2010

David J. Kappos
*Director of the United States Patent and Trademark Office*